(12) United States Patent
Bai

(10) Patent No.: US 11,291,060 B2
(45) Date of Patent: *Mar. 29, 2022

(54) ELECTRONIC APPARATUS, A CENTRAL NODE APPARATUS AND A NETWORK SIDE APPARATUS, A TRANSMISSION METHOD AND A CONFIGURATION METHOD

(71) Applicant: Sony Corporation, Tokyo (JP)

(72) Inventor: Wei Bai, Beijing (CN)

(73) Assignee: SONY CORPORATION, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 16/892,324

(22) Filed: Jun. 4, 2020

(65) Prior Publication Data
US 2020/0296785 A1 Sep. 17, 2020

Related U.S. Application Data

(63) Continuation of application No. 16/103,169, filed on Aug. 14, 2018, now Pat. No. 10,701,747, which is a (Continued)

(30) Foreign Application Priority Data

May 30, 2014 (CN) .......................... 201410239512.3

(51) Int. Cl.
*H04W 76/14* (2018.01)
*H04L 12/801* (2013.01)
(Continued)

(52) U.S. Cl.
CPC ............. *H04W 76/14* (2018.02); *H04L 47/12* (2013.01); *H04L 47/14* (2013.01); *H04L 47/24* (2013.01);
(Continued)

(58) Field of Classification Search
CPC ......... H04W 4/38; H04W 4/70; H04W 76/14; H04W 76/00; H04W 76/10; H04W 76/15;
(Continued)

(56) References Cited

U.S. PATENT DOCUMENTS

2012/0250551 A1 10/2012 Sartori et al.
2012/0329476 A1 12/2012 Tenny
(Continued)

FOREIGN PATENT DOCUMENTS

CN 101127960 A 2/2008
CN 101179836 A 5/2008
(Continued)

OTHER PUBLICATIONS

Office Action dated Aug. 5, 2019 in Chinese Patent Application No. 201410239512.3, 14 pages.

*Primary Examiner* — Ashley Shivers
(74) *Attorney, Agent, or Firm* — Xsensus LLP

(57) ABSTRACT

The present disclosure provides an electronic apparatus, a central node apparatus and a network side apparatus, a transmission method and a configuration method. The electronic apparatus for user equipment UE side includes: a transmission mode determining device configured for determining, based on service type of uplink transmission data that is to be transmitted to a network side apparatus by the electronic apparatus for UE side, whether to adopt a transmission mode in which the uplink transmission data is transmitted to a central node apparatus such that the uplink transmission data is transmitted to the network side apparatus. The electronic apparatus, the central node apparatus and the network side apparatus, the transmission method and the configuration method according to the present disclosure can implement at least one of saving network resources, reducing signaling overhead, and reducing power loss.

15 Claims, 9 Drawing Sheets

Related U.S. Application Data continuation of application No. 14/718,523, filed on May 21, 2015, now Pat. No. 10,075,378.

(51) Int. Cl.
*H04L 47/2408* (2022.01)
*H04W 28/02* (2009.01)
*H04L 47/283* (2022.01)
*H04L 47/36* (2022.01)
*H04L 47/41* (2022.01)
*H04L 47/12* (2022.01)
*H04L 47/24* (2022.01)
*H04L 47/28* (2022.01)
*H04L 47/10* (2022.01)
*H04W 72/12* (2009.01)
*H04W 8/00* (2009.01)
*H04L 47/26* (2022.01)

(52) U.S. Cl.
CPC .......... *H04L 47/2408* (2013.01); *H04L 47/28* (2013.01); *H04L 47/283* (2013.01); *H04L 47/29* (2013.01); *H04L 47/365* (2013.01); *H04L 47/41* (2013.01); *H04W 28/0215* (2013.01); *H04W 28/0247* (2013.01); *H04L 47/26* (2013.01); *H04W 8/005* (2013.01); *H04W 72/1289* (2013.01); *Y02D 30/70* (2020.08)

(58) Field of Classification Search
CPC ...... H04W 76/18; H04L 47/29; H04L 47/122; H04L 47/14; H04L 47/24; H04L 47/2408; H04L 47/2491; H04L 47/283
See application file for complete search history.

(56) References Cited

U.S. PATENT DOCUMENTS

| | | |
|---|---|---|
| 2013/0010601 A1 | 1/2013 | Senarath |
| 2013/0051228 A1 | 2/2013 | Kim |
| 2013/0083723 A1 | 4/2013 | Morioka |
| 2014/0092877 A1 | 4/2014 | Kazmi |
| 2014/0194115 A1 | 7/2014 | Yang et al. |
| 2014/0254471 A1 | 9/2014 | Fang |
| 2014/0269294 A1 | 9/2014 | Morandin |
| 2015/0029866 A1 | 1/2015 | Liao |
| 2015/0092566 A1 | 4/2015 | Balachandran |
| 2016/0057761 A1 | 2/2016 | Panaitopol |
| 2017/0041960 A1 | 2/2017 | Quan |
| 2017/0099688 A1 | 4/2017 | Chae et al. |
| 2017/0188404 A1 | 6/2017 | Fodor |

FOREIGN PATENT DOCUMENTS

| | | |
|---|---|---|
| CN | 101207843 A | 6/2008 |
| CN | 101340492 A | 1/2009 |
| CN | 101431382 A | 5/2009 |
| CN | 101657041 A | 2/2010 |
| CN | 101765218 A | 6/2010 |
| CN | 102571548 A | 7/2012 |

ELECTRONIC APPARATUS, A CENTRAL NODE APPARATUS AND A NETWORK SIDE APPARATUS, A TRANSMISSION METHOD AND A CONFIGURATION METHOD

CROSS REFERENCE TO RELATED APPLICATIONS

This application is a continuation of U.S. application Ser. No. 16/103,169, filed Aug. 14, 2018, which is a continuation of U.S. application Ser. No. 14/718,523, filed on May 21, 2015 (now U.S. Pat. No. 10,075,378), which claims priority to Chinese Patent Application 201410239512.3, filed in the Chinese Patent Office on May 30, 2014, the entirety of each of which are incorporated by reference herein.

TECHNICAL FIELD

The present disclosure relates to the field of wireless communication, and in particular, to an electronic apparatus for user equipment (UE) side, a central node apparatus and a network side apparatus, an uplink data transmission method for UE side, a data transmission method for a central node apparatus and a transmission mode configuration method for a network side apparatus.

BACKGROUND

In the current wireless communication, a service that can support a large number of users/terminals, such as Internet of things, M2M (machine-to-machine communication), is a research focus. Compared with conventional cellular communication, Internet of things or M2M service has the following features: the number of users is relatively large (usually tenfold, hundredfold, for example), the amount of data is relatively small, the terminals are distributed indoor, etc. However, in the conventional network transmission mode, a large number of terminals may result in network congestion, and small packets may cause the problem of excessive signaling overhead, thus transmission efficiency of the entire network may be greatly decreased. Therefore, there is a demand for an electronic apparatus for UE side, a central node apparatus and a network side apparatus, an uplink data transmission method and a transmission mode configuration method capable of solving at least one of the above problems.

SUMMARY OF INVENTION

A brief summary of the present disclosure is given below, so as to provide a basic understanding on some aspects of the present disclosure. It should be understood that the summary is not an exhaustive description of the present disclosure. It is not intended to define a key or important part of the present disclosure, nor is it intended to limit the scope of the present disclosure. It aims to give some concepts in a simplified manner, as a preamble to the more detailed description described later.

In view of above drawbacks of existing techniques, an object of the present disclosure is to provide an electronic apparatus for UE side, a central node apparatus and a network side apparatus, an uplink data transmission method for user equipment (UE) side, a data transmission method for a central node apparatus and a transmission mode configuration method for a network side apparatus, which solve at least the problems of existing techniques.

According to one embodiment of the present disclosure, there is provided an electronic apparatus for UE side, including: a transmission mode determining device configured for determining, based on service type of uplink transmission data that is to be transmitted to a network side apparatus by the electronic apparatus for UE side, whether to adopt a transmission mode in which the uplink transmission data is transmitted to a central node apparatus such that the uplink transmission data is transmitted to the network side apparatus.

According to another embodiment of the present disclosure, there is provided a central node apparatus for performing aggregation transmission to uplink transmission data of at least one electronic apparatus for UE side, the central node apparatus including: a receiving device configured for receiving from the at least one electronic apparatus for UE side a discovery signal indicating a request for transmitting the uplink transmission data through the central node apparatus as well as the uplink transmission data; and a transmitting device configured for aggregating the uplink transmission data of respective electronic apparatus for UE side, and transmitting the aggregated uplink transmission data to a network side apparatus.

According to still another embodiment of the present disclosure, there is provided a network side apparatus, including: a network configuration device, configured for determining whether to adopt a transmission mode in which uplink transmission data is transmitted to a central node apparatus such that the uplink transmission data is transmitted to the network side apparatus based on information that is received from the electronic apparatus for UE side and indicates service type of the uplink transmission data to be transmitted to the network side apparatus by the electronic apparatus for UE side, and configuring the electronic apparatus for UE side by using the determined transmission mode.

According to one embodiment of the present disclosure, there is provided an uplink data transmission method for an electronic apparatus for UE side, including: determining a transmission mode of uplink transmission data that is to be transmitted to a network side apparatus by the electronic apparatus for UE side according to service type of the uplink transmission data; and transmitting the uplink transmission data from the electronic apparatus for UE side to the network side apparatus according to the transmission mode.

According to another embodiment of the present disclosure, there is provided a data transmission method for a central node apparatus, including: receiving, from at least one electronic apparatus for UE side, a discovery signal indicating a request for transmitting uplink transmission data through the central node apparatus as well as the uplink transmission data; and aggregating the uplink transmission data of respective electronic apparatus for UE side and transmitting the aggregated uplink transmission data to the network side apparatus.

According to still another embodiment of the present disclosure, there is provided a transmission mode configuration method for a network side apparatus, including: determining whether to adopt a transmission mode in which uplink transmission data is transmitted to a central node apparatus such that the uplink transmission data is transmitted to the network side apparatus based on information that is received from an electronic apparatus for UE side and indicates service type of the uplink transmission data to be transmitted to the network side apparatus by the electronic apparatus for UE side; and configuring the electronic apparatus for UE side by using the determined transmission mode.

Additionally, the embodiment of the present disclosure provides a computer program for implementing the above-mentioned uplink data transmission method for UE side, the data transmission method for the central node apparatus and the transmission mode configuration method for the network side apparatus.

Furthermore, the embodiment of the present disclosure provides a corresponding computer-readable storage medium on which a computer program code for implementing the above-mentioned uplink data transmission method for UE side, the data transmission method for the central node apparatus and the transmission mode configuration method for the network side apparatus is stored.

The electronic apparatus for UE side, the central node apparatus and the network side apparatus, the data transmission method and the transmission mode configuration method according to embodiments of the present disclosure can implement at least one of the advantageous effects including saving network resources, reducing signaling overhead and reducing power loss.

Through the following detailed description of the best mode of the present disclosure in conjunction with the accompanying drawings, these and other advantages of the present disclosure will become apparent.

BRIEF DESCRIPTION OF DRAWINGS

The disclosure may be understood better by examining description provided in conjunction with the accompanying drawings, in which the same or similar reference numbers are used to represent the same or similar components. The drawings, which are included in the specification together with the following detailed description and form a part of the specification, are used to further illustrate preferred embodiments of the present disclosure and explain principle and advantages of the present disclosure. In the drawings.

Figure 1:
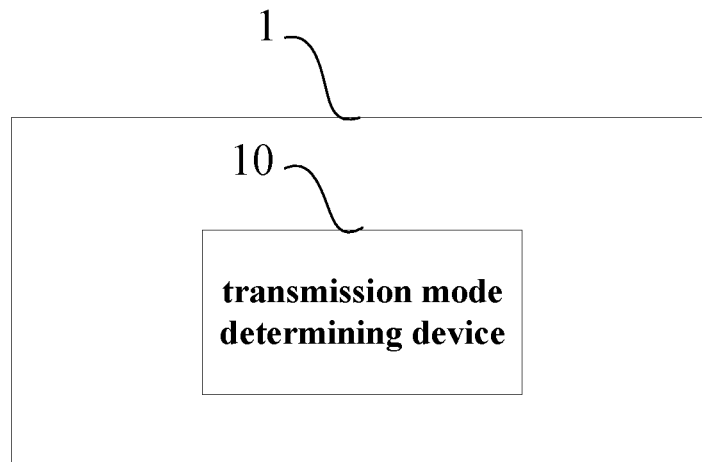
FIG. 1 is a block diagram schematically illustrating an exemplary structure of the electronic apparatus for UE side according to an embodiment of the present disclosure.

The skilled person should understand that elements in the drawings are illustrated for simplicity and clarity, and are not necessarily drawn to scale. For example, some elements in the accompanying drawings may be enlarged with respect to others, so as to facilitate understanding of embodiments of the present disclosure.

DESCRIPTION OF EMBODIMENTS

Exemplary embodiments of the present disclosure are described below in conjunction with the accompanying drawings. For the sake of clarity and conciseness, not all the features of actual implementations are described in the specification. However, it should be understood that in the process of developing actual implementations, numerous implementation-specific decisions must be made to achieve the developer's specific goals, for example, to comply with system-related and service-related conditions which may vary from one implementation to another. Moreover, it also should be understood that although a development effort might be very complex and time-consuming, it is just a routine task for those skilled in the art having the benefit of this disclosure.

It is further noted that only structures and/or steps closely relevant to the solutions of the present disclosure are illustrated in the drawings with other details less relevant to the present disclosure omitted, so as not to obscure the present disclosure due to any unnecessary details.

The inventor has found that, compared with conventional cellular communication, Internet of things or M2M service has the features of small amount of the transmitted data, high tolerance to delay of data, relatively regular interval of data transmission, etc. Thus it can be considered to use D2D (device-to-device) function of the electronic apparatus in UE side (terminal apparatus such as meters, mobile phones), that is, data communication between the user apparatus is directly performed without through a base station. Data is transmitted to a central node apparatus, which aggregates the data received from a plurality of user apparatus and transmits the same to a network side apparatus. By doing so, the purposes of saving network resource, reducing signaling overhead, and reducing power loss can be achieved.

The electronic apparatus for UE side, the central node apparatus and the network side apparatus according to embodiments of the present disclosure are respectively described below.

The Electronic Apparatus for UE Side

FIG. 1 is a block diagram schematically illustrating an exemplary structure of the electronic apparatus for UE side according to an embodiment of the present disclosure.

As shown in FIG. 1, the electronic apparatus for UE side 1 comprises: a transmission mode determining device 10, configured for determining, based on the service type of the uplink transmission data that is to be transmitted to a network side apparatus by the electronic apparatus for UE side, whether to adopt the transmission mode in which the uplink transmission data is transmitted to a central node apparatus such that the uplink transmission data is transmitted to a network side apparatus.

According to the present disclosure, the central node apparatus may be a small apparatus deployed by operators, or an electronic apparatus for UE side configured through wireless signaling by the network side apparatus. For example, the network side apparatus can determine approximate location of the electronic apparatus according to path loss of the electronic apparatus for UE side and arrival angle of uplink transmission signal, and configure a central node apparatus in each designated area in terms of area. The way to select a central node apparatus in a particular area is well known in the art, and is not discussed in more detail herein.

According to an embodiment of the present disclosure, the transmission mode determining device 10 is further configured for determining, in case that it is determined not to adopt the transmission mode in which the uplink transmission data is transmitted to a central node apparatus such that the uplink transmission data is transmitted to a network side apparatus, to adopt the transmission mode in which the uplink transmission data is transmitted to the network side apparatus directly over a cellular network.

According to the present disclosure, the service type of the uplink transmission data comprises at least one of tolerance to transmission delay of the service, typical packet size of the service, typical packet generation interval of the service, and requirement of the service for reliability of packet transmission.

For example, when the tolerance to transmission delay of the service of uplink transmission data is high, the typical packet size of the service is small, the typical packet generation interval of the service is short, or the requirement of the service for reliability of packet transmission is low, the transmission mode determining device 10 may adopt the transmission mode in which the uplink data is firstly transmitted to a central node apparatus by the electronic apparatus for UE side, the data received from a plurality of electronic apparatus for UE side are aggregated and then transmitted to a network side apparatus by the central node apparatus.

According to the present disclosure, the service type of the service can be determined by setting a threshold for the tolerance to transmission delay, a threshold for the packet size, a threshold for the interval, and comparing the above parameters of the service with respective thresholds. According to the present disclosure, whether to adopt the transmission mode in which the uplink transmission data is transmitted to a central node apparatus such that the uplink transmission data is transmitted to a network side apparatus can be determined according to the requirement of the service for reliability of packet transmission. For example, as to certain important uplink signaling, measurement results, etc., the electronic apparatus for UE side may perform transmissions respectively in the following two transmission modes to achieve a higher transmission diversity gain so as to ensure reliable transmission of such signaling: the transmission mode in which the uplink transmission data is transmitted to a central node apparatus such that the uplink transmission data is transmitted to a network side apparatus, and the transmission mode in which the uplink transmission data is transmitted to a network side apparatus directly over a cellular network.

According to the present disclosure, the threshold for the size of the packets to be transmitted by aggregation is calculated from a uplink transmission efficiency of a certain electronic apparatus for UE side or an average uplink transmission efficiency of all electronic apparatus for UE side within a cell, so that one or some electronic apparatus for UE side is or are configured. The transmission mode in which the uplink transmission data is transmitted to a central node apparatus such that the uplink transmission data is transmitted to a network side apparatus is adopted when the typical packet is smaller than the threshold for the packet size.

Furthermore, the tolerance to transmission delay is mainly reflected in a specific application and QCI (QoS class identifier). Therefore, the threshold for transmission delay can be given according to the application and QCI of the present invention.

According to a preferred embodiment of the present disclosure, the transmission mode determining device 10 determines to adopt the transmission mode in which the uplink transmission data is transmitted to a central node apparatus such that the uplink transmission data is transmitted to a network side apparatus when at least one of the following conditions is satisfied: (a) the tolerance to transmission delay of the service is higher than a first threshold (i.e., the threshold for tolerance) and the packet size of the service is smaller than a second threshold (i.e., the threshold for packet size); (b) the packet size of the service is smaller than the second threshold and the typical packet generation interval is fixed and shorter than a third threshold (i.e., the threshold for interval).

For example, when the tolerance to transmission delay of the service of uplink transmission data is low, the typical packet size of the service is big, the typical packet generation interval of the service is long, or the requirement of the service for reliability of packet transmission is high, the transmission mode determining device 10 may determine not to adopt the transmission mode in which the uplink transmission data is transmitted to a central node apparatus such that the uplink transmission data is transmitted to a network side apparatus, but to adopt a conventional transmission mode in which the uplink transmission data is transmitted to a network side apparatus directly over a cellular network for transmitting the uplink transmission data.

According to an embodiment of the present disclosure, in addition to the service type of the uplink transmission data, the transmission mode determining device 10 may determine whether to adopt the transmission mode in which the uplink transmission data is transmitted to a central node apparatus such that the uplink transmission data is transmitted to a network side apparatus based on network condition. In general, the path loss from the electronic apparatus for UE side to the network side apparatus can reflect the network condition. Accordingly, according to an embodiment of the present disclosure, the network condition may be obtained based on the path loss from the electronic apparatus for UE side to the network side apparatus. According to the present disclosure, the transmission mode determining device 10 determines to adopt the transmission mode in which the uplink transmission data is transmitted to a central node apparatus such that the uplink transmission data is transmitted to a network side apparatus when the path loss is larger than a fourth threshold. It will be understood by the person skilled in the art that the fourth threshold may also be set based on the application of the present disclosure.

Although it has been described in above embodiments that whether to adopt the transmission mode in which the uplink transmission data is transmitted to a central node apparatus such that the uplink transmission data is transmitted to a network side apparatus is determined from the service type of the uplink transmission data or from both of the service type of the uplink transmission data and the network condition (for example, when the packet size of the service is smaller than the second threshold and the path loss indicating the network condition is larger than the fourth threshold, the transmission mode determining device 10 determines to adopt the transmission mode in which the uplink transmission data is transmitted to a network side apparatus via a central node apparatus), the person skilled in the art will understand that the transmission mode determining device 10 may also determine whether to adopt the transmission mode in which the uplink transmission data is transmitted to a central node apparatus such that the uplink transmission data is transmitted to a network side apparatus only based on the network condition.

Figure 2:
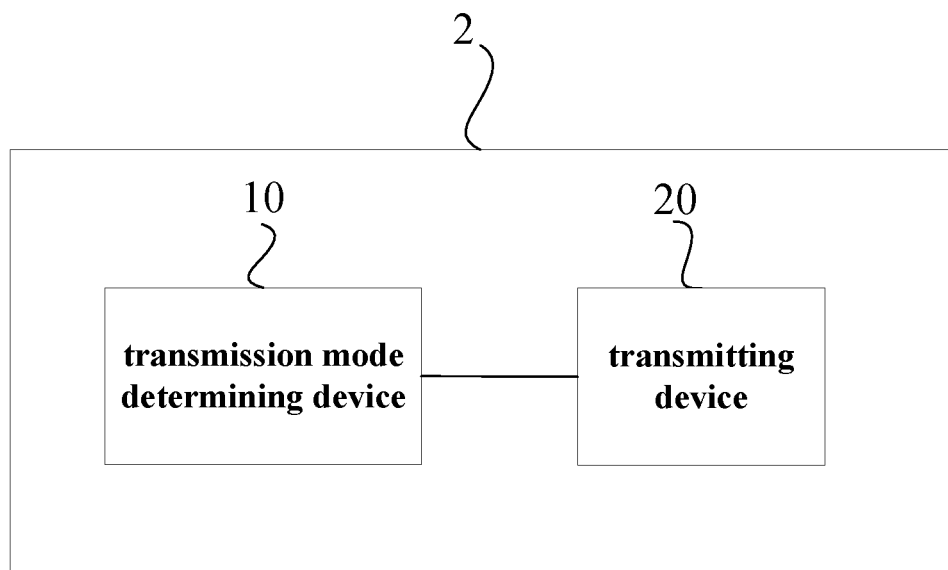
FIG. 2 is a block diagram schematically illustrating another exemplary structure of the electronic apparatus for UE side according to an embodiment of the present disclosure.

FIG. 2 is a block diagram schematically illustrating another exemplary structure of the electronic apparatus for UE side according to an embodiment of the present disclosure.

As shown in FIG. 2, in addition to comprising the transmission mode determining device 10 similar to the electronic apparatus for UE side 1 in FIG. 1, the electronic apparatus for UE side 2 further comprises: a transmitting device 20 configured for, in the case that the transmission mode determining device 10 determines to adopt the transmission mode in which the uplink transmission data is transmitted to a central node apparatus such that the uplink transmission data is transmitted to a network side apparatus, transmitting a discovery signal for discovering the central node apparatus in a predetermined range of the electronic apparatus for UE side.

According to an embodiment of the present disclosure, the discovery signal is a discovery signal defined in D2D (device-to-device) transmission. According to the present disclosure, the transmitting device 20 may include QCI value of the uplink transmission data and waiting time that has past in the discovery signal when transmitting the discovery signal. And, the transmitting device 20 may monitor a feedback signal of the discovery signal, and transmit the uplink transmission data according to a time slot specified in the feedback signal.

Specifically, in the case of determining, according to the service type of the uplink transmission data and/or the network condition, that the transmission mode in which the uplink transmission data is transmitted to a central node apparatus such that the uplink transmission data is transmitted to a network side apparatus is proper for the uplink transmission data, the transmitting device 20 transmits the D2D discovery signal to discover the central node apparatus in a predetermined range of the electronic apparatus for UE side. Upon the transmission of the D2D discovery signal by the transmitting device 20 for UE side, the transmitting device 20 further monitors any possible feedback information. If the feedback information is received, the transmitting device 20 transmits the uplink transmission data according to the time slot specified in the feedback signal.

According to one embodiment of the present disclosure, the discovery signal may include information for indicating at least one of requirement of the electronic apparatus for UE side for delay of uplink transmission data, typical packet size, and typical packet interval.

When the feedback information transmitted by the central node apparatus is monitored by the transmitting device 20, the transmitting device transmits the uplink transmission data to the central node apparatus in D2D transmission mode, such that the uplink transmission data of a plurality of electronic apparatus for UE side are aggregated and then transmitted to the network side apparatus by the central node apparatus.

The electronic apparatus for UE side according to an embodiment of the present disclosure may determine whether aggregation transmission (that is, the uplink transmission data from a plurality of electronic apparatus for UE side are aggregated and then transmitted to the network side apparatus by the central node apparatus) is appropriate based on the service type and/or the network condition, when there is uplink transmission data to be transmitted in uplink channel. As such, the aggregation transmission is performed on the uplink transmission data suitable for aggregation transmission, so as to implement at least one of saving network resources, reducing signaling overhead, and reducing power loss.

Furthermore, the embodiment of the present disclosure provides an electronic apparatus for UE side, comprising: a transmission mode determining device configured for determining, based on the service type of the uplink transmission data to be transmitted to a network side apparatus by the electronic apparatus for UE side and/or the network condition, whether to adopt the transmission mode in which the uplink transmission data is transmitted to a central node apparatus such that the uplink transmission data is transmitted to a network side apparatus or to adopt the transmission mode in which the uplink transmission data is transmitted to the network side apparatus directly over a cellular network. Compared with the electronic apparatus for UE side 1 described with reference to FIGS. 1 and 2, the electronic apparatus for UE side can select the transmission mode in which a plurality of uplink transmission data are aggregated and then sent to the network side apparatus by the central node apparatus or the transmission mode in which a plurality of uplink transmission data are transmitted to the network side apparatus directly, based on which one of the above two transmission modes is suitable for the service type of the uplink transmission data and/or the network condition.

The Central Node Apparatus

Figure 3:
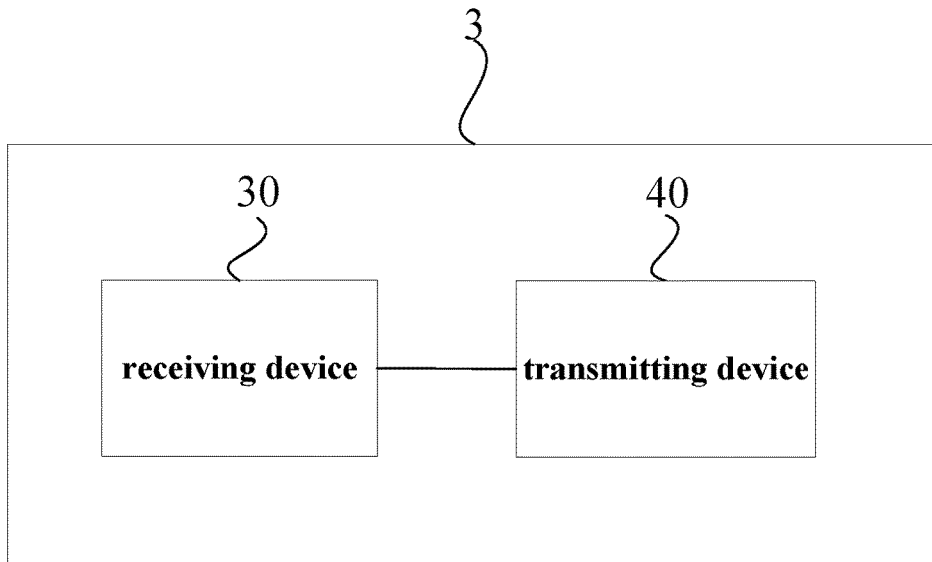
FIG. 3 is a block diagram schematically illustrating an exemplary structure of the central node apparatus according to an embodiment of the present disclosure.

FIG. 3 is a block diagram schematically illustrating an exemplary structure of the central node apparatus according to an embodiment of the present disclosure.

The central node apparatus according to the present disclosure is configured to perform aggregation transmission with respect to the uplink transmission data of at least one electronic apparatus for UE side.

As shown in FIG. 3, the central node apparatus 3 includes: a receiving device 30 for receiving, from at least one electronic apparatus for UE side, a discovery signal indicating a request for transmitting the uplink transmission data through the central node apparatus and the uplink transmission data; and a transmitting device 40 for aggregating the transmission data of respective electronic apparatus for UE side, and transmitting the aggregated uplink transmission data to a network side apparatus.

According to an embodiment of the present disclosure, the electronic apparatus for UE side may be the electronic apparatus 1 or 2 shown in FIGS. 1 and 2. For example, in case that the electronic apparatus 1 or 2 for UE side determines to adopt the transmission mode in which the uplink transmission data is transmitted to a central node apparatus to transmit the uplink transmission data to a network side apparatus and to search for a discovery signal of the central node apparatus in a predetermined range of the electronic apparatus for UE side, the receiving device 30 of the central node apparatus 3 can receive the discovery signal from the electronic apparatus for UE side 1 or 2.

According to one embodiment of the present disclosure, the receiving device 30 of the central node apparatus 3 can receive the discovery signals from a plurality of electronic apparatus for UE side.

According to the present disclosure, the receiving device 30 is further configured to receive the information indicating the service type of the uplink transmission data of the at least one electronic apparatus for UE side. According to an embodiment of the present disclosure, the electronic apparatus for UE side can include the information indicating the service type of the uplink transmission data of the at least one electronic apparatus for UE side in the discovery signal, such that the information indicating the service type of the uplink transmission data is transmitted at the same time when transmitting the discovery signal, so that the receiving device 30 can obtain the service type of the uplink transmission data of the electronic apparatus when receiving the discovery signal from the electronic apparatus for UE side.

The service type may include at least one of requirement of the electronic apparatus for UE side for delay of the transmission of the uplink transmission data, typical packet size, typical packet interval, and requirement for reliability of packet transmission.

When the discovery signal from the electronic apparatus for UE side is received, the central node apparatus 3 can transmit a feedback signal to the electronic apparatus for UE side through the transmitting device 40, so that the electronic apparatus for UE side transmits the discovery signal to the central node apparatus 3 according to the transmission time slot and the distributed resources given by the feedback signal.

According to an embodiment of the present disclosure, the feedback signal is a discovery signal defined in LTE D2D.

The feedback signal may have the following format and content, but not limited thereto:
{a discovery signal identifier-1
   a resource distribution information (may include frequency resource, the length of duration time, etc.)
   a time slot resource, such as the time offset with respect to the feedback signal a discovery signal identifier-2
. . . }

The communication between at least one electronic apparatus for UE side and the central node apparatus can be implemented by device-to-device (D2D) transmission. Specifically, the reception by the receiving device 30 of the central node apparatus 3 according to an embodiment of the present disclosure from at least one electronic apparatus for UE side is implemented by LTE D2D transmission, and the transmission by the transmitting device 40 to at least one electronic apparatus for UE side is implemented by LTE D2D transmission.

When the uplink transmission data from at least one electronic apparatus for UE side is received by the receiving device 30, the transmitting device 40 aggregates respective uplink transmission data and then transmits it to the network side apparatus, so as to implement the uplink transmission of the uplink transmission data from the terminal apparatus for UE side to the network side apparatus. According to the present disclosure, after the uplink transmission data from respective electronic apparatus for UE side are aggregated, the transmitting device 40 can transmit the aggregated uplink transmission data to the network side apparatus by using a common LTE uplink transmission mode.

According to the present disclosure, the transmitting device 40 is further configured to add a user identifier to the uplink transmission data received from at least one electronic apparatus for UE side by the receiving device 30, and aggregate the uplink transmission data having been added a user identifier. For example, the transmitting device 40 can add a user identifier to the uplink transmission data of each electronic apparatus for UE side, and then aggregate the uplink transmission data from different electronic apparatus for UE side. Therefore, after the aggregated uplink transmission data is received by the network side apparatus, the network side apparatus identifies the electronic apparatus for UE side that transmits respective uplink transmission data according to the user identifier.

Taking the case where the aggregated uplink transmission data packet includes uplink transmission data from 3 different electronic apparatus for UE side X, Y, Z as an example, the structure of the aggregated uplink transmission data packet is shown in table 1.

TABLE 1

| UE ID1 | UE ID2 | UE ID3 | Data-1 | Data-2 | Data-3 |
|---|---|---|---|---|---| wherein UE ID1, UE ID2, UE ID3 indicates the user identifier from electronic apparatus for UE side X, Y, Z respectively, Data-1, Data-2, Data-3 indicates the uplink transmission data from electronic apparatus for UE side X, Y, Z respectively.

Figure 4:
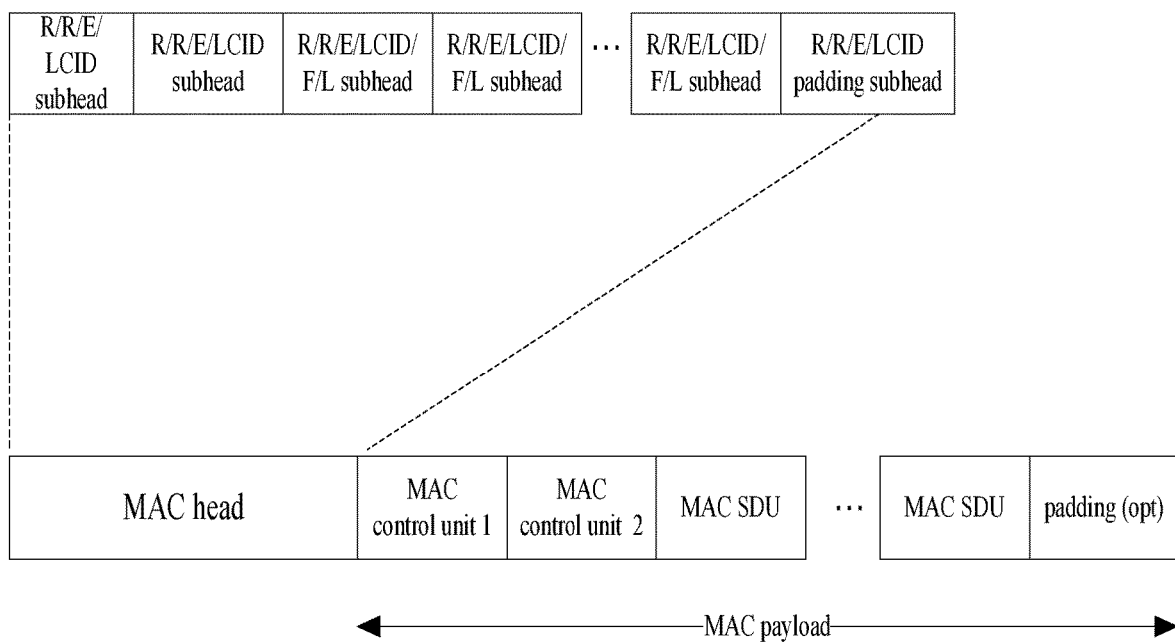
FIG. 4 illustrates an example format of the uplink transmission data according to an embodiment of the present disclosure.

FIG. 4 illustrates an example format of the uplink transmission data according to an embodiment of the present disclosure, i.e., the MAC PDU (MAC (Media Access Control) protocol data unit) format defined in LTE-FDD TS36.321 protocol. As shown in FIG. 4, MAC PDU is a bit string byte-aligned in length, which includes one MAC head, more than one MAC control unit, more than one MAC service data unit (MAC SDU) and possible padding.

For example, the uplink transmission data of the electronic apparatus for UE side according to an embodiment of the present disclosure (such as Data-1, Data-2, Data-3 in Table 1) may be the MAC PDU format as shown in FIG. 4. For example, the electronic apparatus for UE side used for transmitting the uplink transmission data can multiplex the MAC control unit and the MAC SDU in the MAC PDU, and send it to the central node apparatus. In this case, the central node apparatus further multiplexes the MAC PDU from respective electronic apparatus for UE side in the aggregated data packets as shown in table 1.

According to the present disclosure, the transmitting device 40 can perform an aggregation operation with respect to the uplink transmission data in the MAC layer of the data link layer, and the aggregation operation may be transparent to other layers above the MAC layer.

Figure 5:
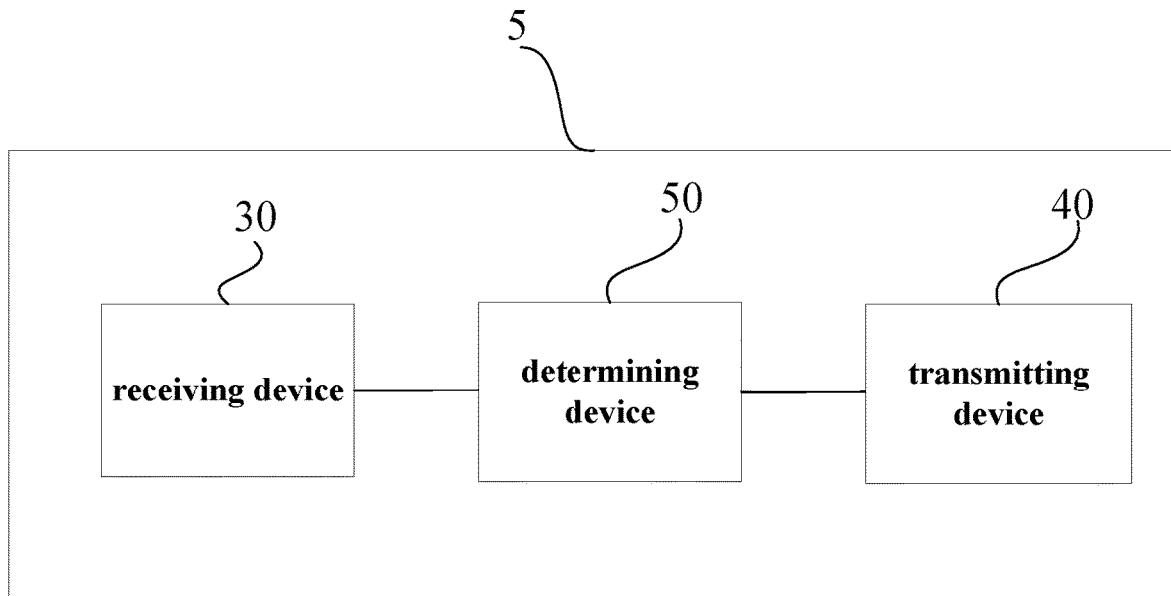
FIG. 5 is a block diagram schematically illustrating another exemplary structure of the central node apparatus according to an embodiment of the present disclosure.

FIG. 5 is a block diagram schematically illustrating another exemplary structure of the central node apparatus according to an embodiment of the present disclosure.

As shown in FIG. 5, in addition to including the receiving device 30 and the transmitting device 40 similar to the central node apparatus 3 in FIG. 3, the central node apparatus 5 further includes: a determining device 50 configured for determining, with respect to each electronic apparatus for UE side, the transmission time slot and transmission resource for the electronic apparatus for UE side transmitting data to the central node apparatus according to the information on the service type of the uplink transmission data of the electronic apparatus for UE side received by the receiving device.

The transmitting device 40 is further configured to transmit a feedback signal to at least one electronic apparatus for UE side in response to the received discovery signal, the feedback signal including the transmission time slot and transmission resource determined by the determining device with respect to the electronic apparatus for UE side.

More specifically, the determining device 50 determines different transmission time slots and transmission resources for respective electronic apparatus for UE side according to the service type of the uplink transmission data received from respective electronic apparatus for UE side, and in response to the discovery signal of respective electronic apparatus for UE side, the transmitting device 40 transmits the determined transmission time slot and transmission resource along with the feedback signal to respective electronic apparatus for UE side by including the determined transmission time slot and transmission resource in the feedback signal of the aimed discovery signal.

According to the present disclosure, the determining device 50 is further configured to determine the transmission time at which the aggregated uplink transmission data is transmitted to the network side apparatus according to the information on the service type of the uplink transmission data received by the receiving device 30 and/or the network configuration, so that the transmitting device 40 transmits the aggregated uplink transmission data to the network side apparatus on the transmission time.

According to one embodiment of the present disclosure, the determining device 50 can determine the transmission time for transmitting the aggregated uplink transmission data according to the remaining valid time of the uplink transmission data with the minimum remaining valid time in the aggregated sets of uplink transmission data. As one example, the determining device 50 can determine the remaining valid time according to the tolerance to the transmission delay included in the service type information corresponding to respective uplink transmission data and the time the uplink transmission data has resided in the central node apparatus side. For example, the central node apparatus 4 has received the uplink transmission data of 4 electronic apparatus for UE side A, B, C, D, the tolerance to the transmission delay of these 4 uplink transmission data is 7 seconds, 11 seconds, 5 seconds and 11 seconds respectively, correspondingly, the 4 sets of uplink transmission data has resided in the central node apparatus for 2 seconds, 3 seconds, 2 seconds and 1 second, the remaining valid time is 5 seconds, 8 seconds, 3 seconds and 10 seconds respectively, so the transmitting device 40 of the central node apparatus 4 needs to transmit the aggregated uplink transmission data in 3 seconds, so as to ensure that the uplink transmission data of electronic apparatus for UE side A, B, C, D are transmitted to the network side apparatus in the valid time period.

During aggregating the uplink transmission data from respective electronic apparatus for UE side, the transmitting device 40 can aggregate the uplink transmission data with adjacent remaining valid times (e.g., the difference between remaining valid times is within a predetermined time threshold) according to tolerance to the delay of the received uplink transmission data.

There has been described above that the determining device 50 determines that the transmitting device 40 of the central node apparatus 4 transmits the aggregated uplink transmission data to the network side apparatus on a certain transmission time according to the information on the service type received by the central node apparatus 4 from respective electronic apparatus for UE side (e.g., the tolerance to the transmission delay of the uplink transmission data), but the present disclosure is not limited thereto. According to the present disclosure, the determining device can determine the transmission time according to the network configuration, such as the current ratio of data load to signaling overhead. In this case, for example, the time when the current data load to signaling overhead ratio is smaller than a predetermined signaling overhead ratio threshold can be determined as the transmission time at which the aggregated uplink transmission data is transmitted to the network side apparatus by the central node apparatus.

The signaling overhead ratio threshold can be determined according to the current load condition, the number of the electronic apparatus for UE side residing in the cell, etc. For example, if the current load in the cell is relatively high and the utilization rate of wireless resources is above 80%, the signaling overhead ratio threshold can be determined as 10%; if the current load in the cell is relatively low and the utilization rate of wireless resources is only 20%, the signaling overhead ratio threshold can be set as a large value (e.g., 80%), so as to release the limitation of the signaling overhead.

When the transmission time is determined by the determining device 50, the aggregated uplink transmission data is transmitted to the network side apparatus by the transmitting device 40 at the determined transmission time.

Figure 6:
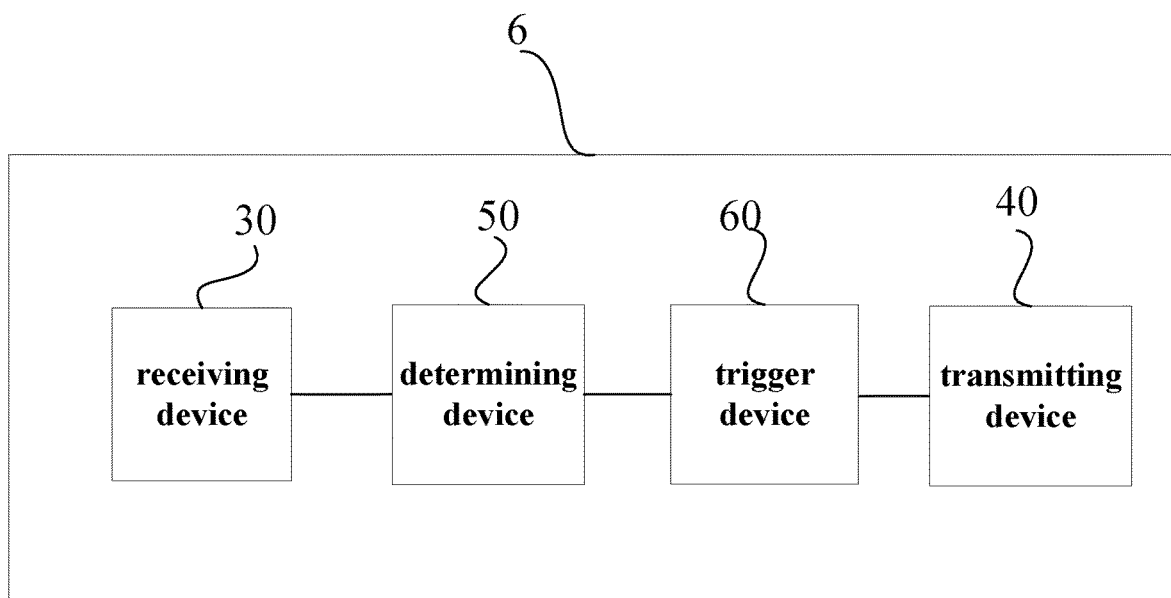
FIG. 6 is a block diagram schematically illustrating still another exemplary structure of the central node apparatus according to an embodiment of the present disclosure.

FIG. 6 is a block diagram schematically illustrating still another exemplary structure of the central node apparatus according to an embodiment of the present disclosure.

As shown in FIG. 6, in addition to including the receiving device 30, the transmitting device 40 and the determining device 50, similar to the central node apparatus 5 in FIG. 5, the central node apparatus 6 further includes: a trigger device 60 configured to trigger sending a scheduling request to the network side apparatus at a predetermined time point prior to the determined transmission time, wherein the transmitting device is further configured to, based on the response of the network side apparatus with regard to the scheduling request, transmit the aggregated uplink transmission data to the network side apparatus on the transmission resource indicated by the response.

When the uplink transmission data from 4 electronic apparatus for UE side A, B, C, D are aggregated by the transmitting device 40, the trigger device 60 can trigger sending a scheduling request to the network side apparatus according to the remaining valid time of the uplink transmission data with the minimum remaining valid time (i.e., the uplink transmission data of electronic apparatus D), for example, in a predetermined time point (e.g., 100 ms before the minimum remaining time 3 seconds), trigger sending a scheduling request, and the transmitting device 40 transmits the aggregated uplink transmission data to the network side apparatus on the transmission resource indicated by the response based on the response of the network side apparatus with regard to the scheduling request.

According to the present disclosure, the electronic apparatus for UE side, the central node apparatus may be a product with wireless communication function such as a mobile phone, a computer, a vehicle, etc., or a processing circuit such as a chip, in a product with wireless communication function, such as a mobile phone, a computer, a vehicle, etc. Furthermore, the function of respective devices included in the electronic apparatus or the central node apparatus may be implemented by corresponding different circuits, or by a whole piece of integrated circuit.

The Network Side Apparatus

It is described above that the electronic apparatus for UE side determines, based on the service type of the uplink transmission data to be transmitted to a network side apparatus by the electronic apparatus for UE side, whether to adopt the transmission mode in which the uplink transmission data is transmitted to a central node apparatus so as to transmit the uplink transmission data to a network side apparatus, but the present disclosure is not limited thereto. For example, the operation of determining whether to adopt above transmission mode may be performed by a network side apparatus based on the service type of the uplink transmission data to be transmitted to a network side apparatus by the electronic apparatus for UE side, and the electronic apparatus for UE side is configured based on the determination result.

Figure 7:
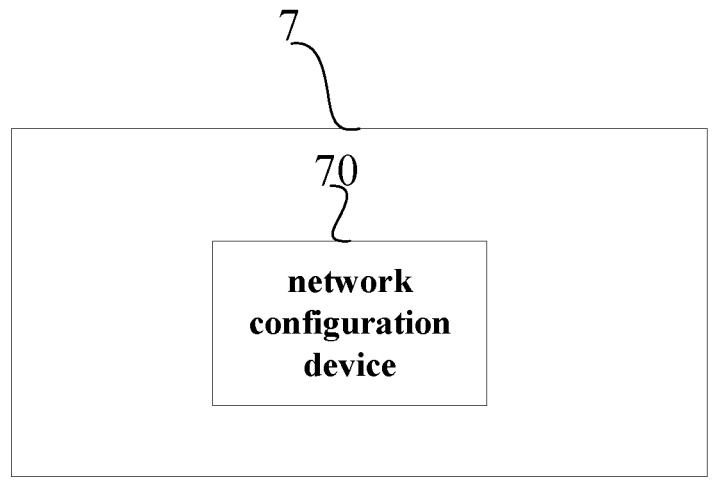
FIG. 7 is a block diagram schematically illustrating an exemplary structure of the network side apparatus according to an embodiment of the present disclosure.

FIG. 7 is a block diagram schematically illustrating an exemplary structure of the network side apparatus according to an embodiment of the present disclosure.

As shown in FIG. 7, the network side apparatus comprises: a network configuration device 70 configured to determine whether to adopt the transmission mode in which the uplink transmission data is transmitted to a central node apparatus so as to transmit the uplink transmission data to a network side apparatus based on the information, received from the electronic apparatus for UE side, on the service type of the uplink transmission data to be transmitted to a network side apparatus by the electronic apparatus for UE side, and to configure the electronic apparatus for UE side by using the determined transmission mode.

The operation that the network configuration device 70 determines whether to adopt the transmission mode in which the uplink transmission data is transmitted to a central node apparatus so as to transmit the uplink transmission data to a network side apparatus is similar to the operation of the transmission mode determining device 10 of the electronic apparatus for UE side described by referring to FIGS. 1 and 2, the detailed description thereof is omitted here.

In case that it is determined to adopt the transmission mode in which the uplink transmission data is transmitted to a central node apparatus so as to transmit the uplink transmission data to a network side apparatus, the electronic apparatus for UE side is configured by using the determined transmission mode, so as to transmit the uplink transmission data according to the transmission mode.

Similar to the transmission mode determining device 10 illustrated in FIGS. 1 and 2, in case that it is determined not to adopt the transmission mode in which the uplink transmission data is transmitted to a central node apparatus so as to transmit the uplink transmission data to a network side apparatus, the network configuration device 70 configures the transmission mode of the electronic apparatus for UE side such that the uplink transmission data is transmitted to the network side apparatus directly over a cellular network, that is, the uplink transmission data is transmitted by using a conventional mode of cellular communication.

According to the present disclosure, the service type of the uplink transmission data comprises at least one of tolerance to transmission delay of the service, typical packet size of the service, typical packet generation interval of the service, and requirement of the service for reliability of packet transmission.

More specifically, the network configuration device 70 determines to adopt the transmission mode in which the uplink transmission data is transmitted to a central node apparatus so as to transmit the uplink transmission data to a network side apparatus and configures the electronic apparatus for UE side by using the determined transmission mode when at least one of the following conditions is satisfied: (a) the tolerance to the transmission delay of the service is higher than a first threshold (i.e., the threshold of the tolerance) and the packet size of the service is smaller than a second threshold (i.e., the threshold of the packet size); (b) the packet size of the service is smaller than the second threshold and the typical packet generation interval is fixed and shorter than a third threshold (i.e., the threshold of the interval). The setting of respective thresholds is similar to the setting of the transmission determining device described by referring to FIGS. 1 and 2, the description thereof is omitted here.

Similar to the transmission determining device 10 described in FIGS. 1 and 2, the network configuration device is further configured to determine whether to adopt the transmission mode in which the uplink transmission data is transmitted to a central node apparatus so as to transmit the uplink transmission data to a network side apparatus based on a network condition, wherein the network condition is obtained based on the path loss from the electronic apparatus for UE side to the network side apparatus. The network configuration device determines to adopt the transmission mode in which the uplink transmission data is transmitted to a central node apparatus so as to transmit the uplink transmission data to a network side apparatus when the path loss is larger than the fourth threshold.

Figure 8:
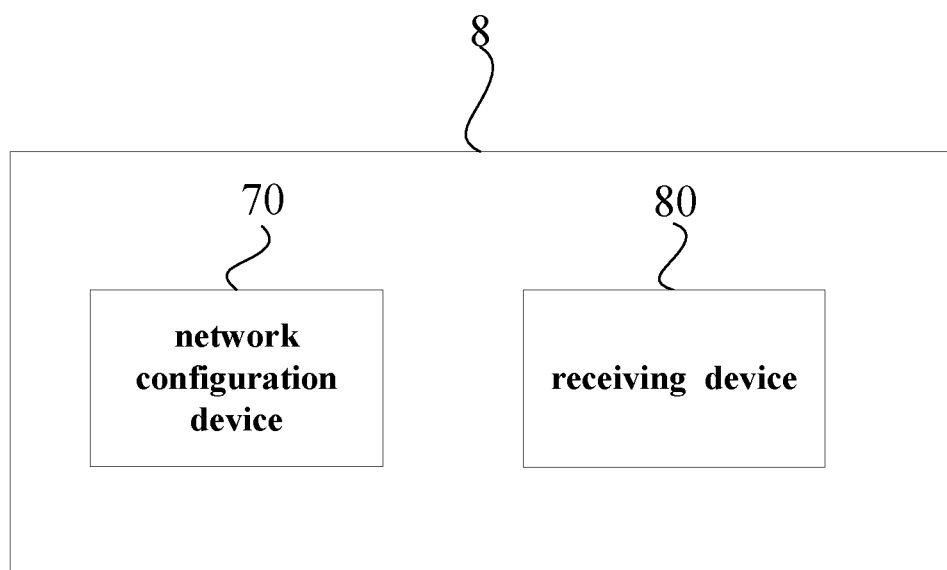
FIG. 8 is a block diagram schematically illustrating another exemplary structure of the network side apparatus according to an embodiment of the present disclosure.

FIG. 8 is a block diagram schematically illustrating another exemplary structure of the network side apparatus according to an embodiment of the present disclosure.

In addition to including the network configuration device 70 similar to the network side apparatus 7 in FIG. 7, the network side apparatus 8 shown in FIG. 8 further includes: a receiving device 80 configured to receive uplink transmission data from a central node apparatus, and determine whether the uplink transmission data is an aggregated uplink transmission data or a conventional uplink transmission data according to the type of the packet head of the received uplink transmission data.

For example, if the packet head of the uplink transmission data received by the receiving device 80 includes a plurality of user IDs, it can determined that the received uplink transmission data is the aggregated uplink transmission data, if the packet head of the uplink transmission data received by the receiving device 80 includes only one user ID, it can determined that the received uplink transmission data is the conventional uplink transmission data transmitted to the network side apparatus by the central node apparatus as the electronic apparatus for UE side.

Figure 9:
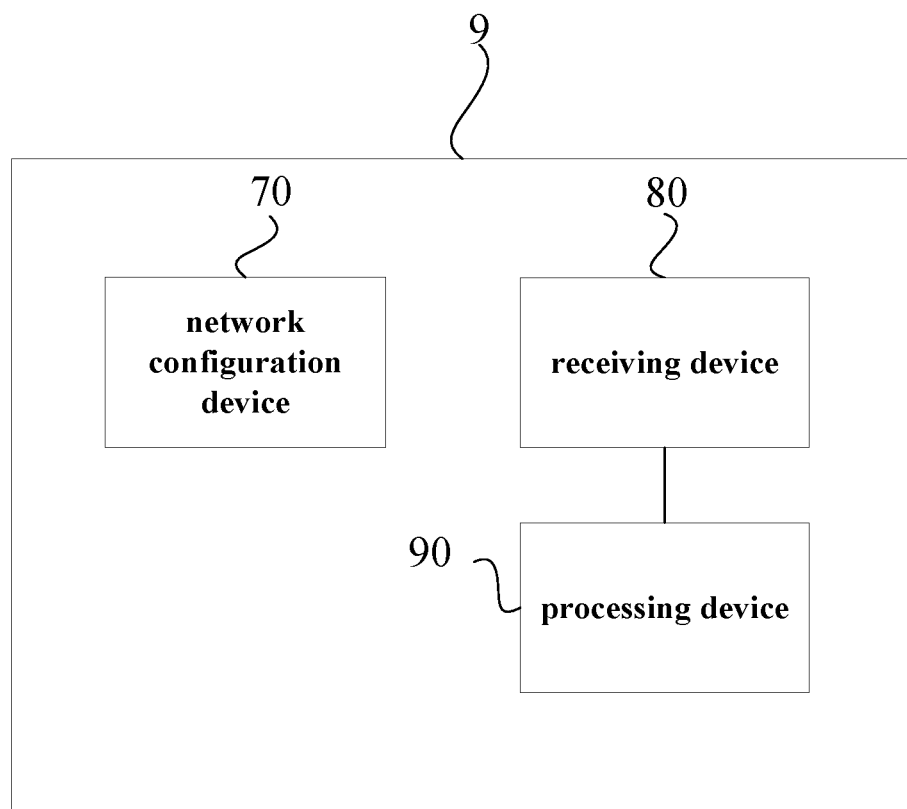
FIG. 9 is a block diagram schematically illustrating still another exemplary structure of the network side apparatus according to an embodiment of the present disclosure.

FIG. 9 is a block diagram schematically illustrating still another exemplary structure of the network side apparatus according to an embodiment of the present disclosure.

As shown in FIG. 9, in addition to including the network configuration device 70, the receiving device 80 similar to the network side apparatus 8 in FIG. 8, the network side apparatus 9 further includes: a processing device 90 configured for transferring the uplink transmission data of respective users to an application layer directly when the receiving device determines that the uplink transmission data is conventional uplink transmission data, and transferring the uplink transmission data of respective users to the application layer respectively according to the user identifier in the packet head when the receiving device determines that the uplink transmission data is aggregated uplink transmission data.

According to one embodiments of the present disclosure, it is further provided an uplink data transmission method for an electronic apparatus for UE side. An exemplary process of the uplink data transmission method is described in conjunction with FIG. 10.

Figure 10:
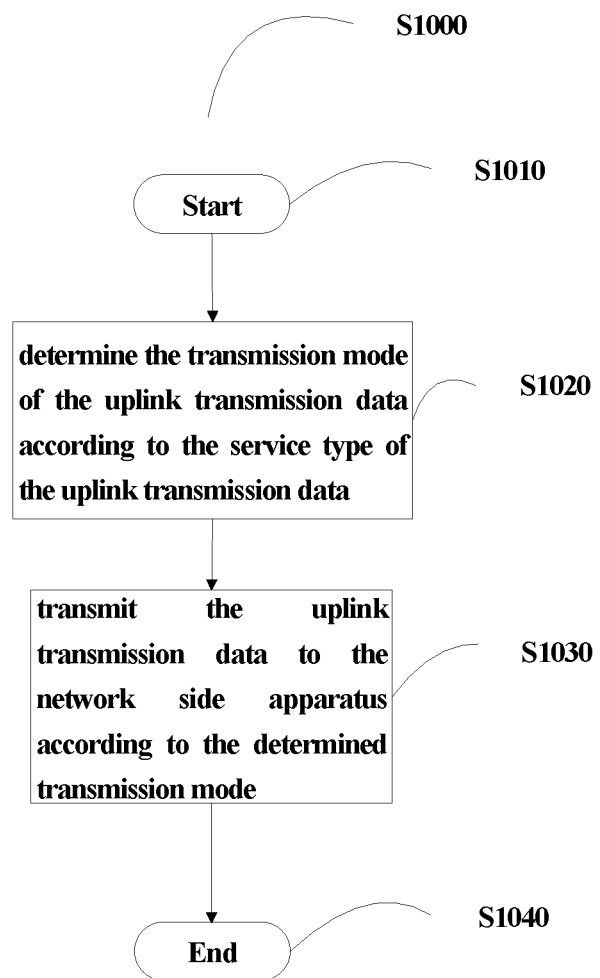
FIG. 10 is a flowchart schematically illustrating an uplink data transmission method for an electronic apparatus for UE side according to an embodiment of the present disclosure.

As shown in FIG. 10, the process flow 1000 of the uplink data transmission method for an electronic apparatus for UE side according to an embodiment of the present disclosure begins at S1010, and then the process of S1020 is performed.

In S1020, the transmission mode of the uplink transmission data is determined according to the service type of the uplink transmission data to be transmitted to the network side apparatus by the electronic apparatus for UE side and/or the network condition.

More specifically, whether the uplink transmission data of the electronic apparatus for UE side is suitable to be aggregated by the central node apparatus and then collectively transmitted to the network side apparatus can be determined, for example, according to the tolerance to the transmission delay of the service, the typical packet size of the service, the typical packet generation interval of the service, and the requirement of the service for reliability of packet transmission, if so, it is determined to adopt the transmission mode in which the uplink transmission data is transmitted to a central node apparatus so as to transmit the uplink transmission data to a network side apparatus, if not, it is determined to adopt the transmission mode in which the uplink transmission data is transmitted to the network side apparatus directly over the cellular network.

According to the present disclosure, in S1020, it is determined to adopt the transmission mode in which the uplink transmission data is transmitted to a central node apparatus so as to transmit the uplink transmission data to a network side apparatus when at least one of the following conditions is satisfied: (a) the tolerance to the transmission delay of the service is higher than a first threshold and the packet size of the service is smaller than a second threshold; (b) the packet size of the service is smaller than the second threshold and the typical packet generation interval is fixed and shorter than a third threshold.

According to another embodiment of the present disclosure, in S1020, whether to adopt the transmission mode in which the uplink transmission data is transmitted to a central node apparatus so as to transmit the uplink transmission data to a network side apparatus is determined also based on the network condition, wherein the network condition is obtained based on the path loss from the electronic apparatus for UE side to the network side apparatus. For example, in S1020, it is determined to adopt the transmission mode in which the uplink transmission data is transmitted to a central node apparatus so as to transmit the uplink transmission data to a network side apparatus when the path loss is larger than a fourth threshold.

S1020 can also refer to the operation of the transmission mode determining device described in conjunction with FIGS. 1 and 2. Then S1030 is performed.

In S1030, the uplink transmission data is transmitted from the electronic apparatus for UE side to the network side apparatus according to the transmission mode determined in S1020. Then S1040 is performed.

The process flow 1000 ends at S1040.

According to one embodiment of the present disclosure, it is further provided a data transmission method for a central node apparatus. An exemplary process of the data transmission method for a central node apparatus is described in conjunction with FIG. 11.

Figure 11:
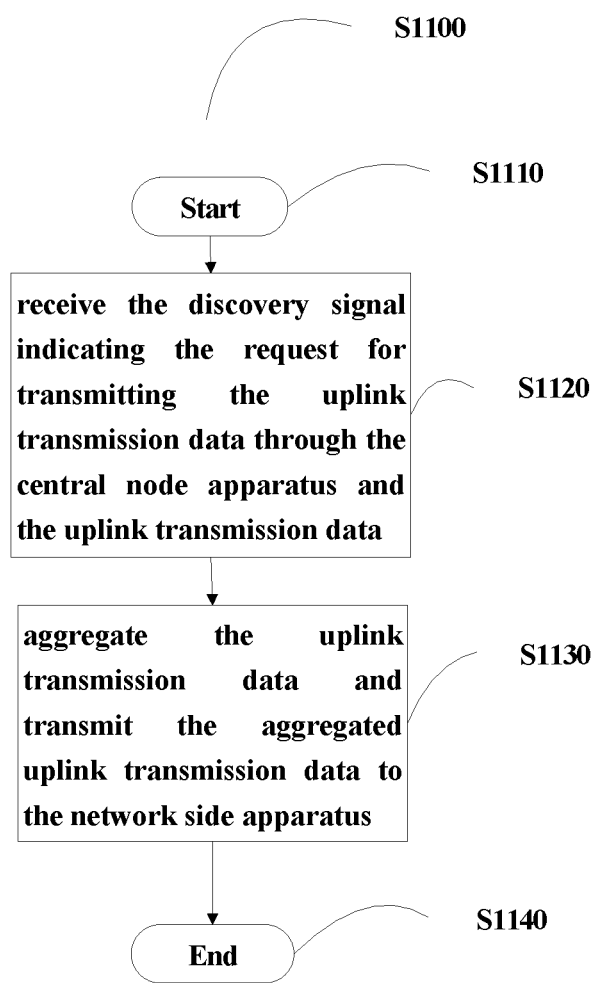
FIG. 11 is a flowchart schematically illustrating a data transmission method for a central node apparatus according to an embodiment of the present disclosure.

As shown in FIG. 11, the process flow 1100 of the data transmission method for a central node apparatus according to an embodiment of the present disclosure begins at S1110, and then the process of S1120 is performed.

In 1120, the discovery signal indicating the request for transmitting the uplink transmission data through the central node apparatus and the uplink transmission data are received from at least one electronic apparatus for UE side.

More specifically, in 1120, the information indicating the service type of the uplink transmission data of at least one electronic apparatus for UE side is also received from the at least one electronic apparatus for UE side.

According to one embodiment of the present disclosure, the information indicating the service type of the uplink transmission data of at least one electronic apparatus for UE side can also be included in the discovery signal, so that the information indicating the service type of the uplink transmission data of at least one electronic apparatus for UE side is obtained when the discovery signal is received by the central node apparatus. According to one embodiment of the present disclosure, the service type may include at least one of requirement of the electronic apparatus for UE side for transmission delay of the uplink transmission data, typical packet size, typical packet generation interval, and requirement for reliability of packet transmission.

According to the present disclosure, the transmission time slot and transmission resource for the electronic apparatus for UE side transmitting data to the central node apparatus can be determined, with respect to each electronic apparatus for UE side, according to the information on the service type of the uplink transmission data of the electronic apparatus for UE side received by the receiving device. Then, the feedback signal including the transmission time slot and transmission resource determined with respect to the electronic apparatus for UE side is transmitted to at least one electronic apparatus for UE side in response to the received discovery signal, so that each of the at least one electronic apparatus for UE side transmits the uplink transmission data to the central node apparatus with the transmission time slot and transmission resource.

According to a preferred embodiment of the present disclosure, the feedback signal can be a discovery signal defined by LTE D2D. And, the reception of the central node apparatus from at least one electronic apparatus for UE side may be realized by LTE D2D transmission, the transmission of the central node apparatus to the at least one electronic apparatus for UE side may also be realized by LTE D2D transmission.

S1120 can also refer to the operation of the receiving device described in conjunction with FIGS. 3 to 6, the detailed description thereof is omitted here. Then S1130 is performed.

In S1130, the uplink transmission data of respective electronic apparatus for UE side is aggregated and the aggregated uplink transmission data is transmitted to the network side apparatus. Then S1040 is performed.

The process flow 1100 ends at S1140.

According to one embodiment of the present disclosure, the transmission time at which the aggregated uplink transmission data is transmitted to the network side apparatus is determined according to the information on the service type of the uplink transmission data and/or the network configuration, and the aggregated uplink transmission data is transmitted to the network side apparatus at the transmission time. More specifically, the transmission time at which the aggregated uplink transmission data is transmitted to the network side apparatus can be determined according to the period of validity of the uplink transmission data received by the central node apparatus or the current ratio of data load to signaling overhead.

According to the present disclosure, before the aggregated uplink transmission data is transmitted from the central node apparatus to the network side apparatus, a user identifier may be added to the uplink transmission data received from at least one electronic apparatus for UE side, and an aggregation is performed with respect to the uplink transmission data that have been added with the user identifier.

According to the present disclosure, the aggregation operation on the uplink transmission data may be implemented in MAC layer, and is transparency to higher layers.

According to another embodiment of the present disclosure, it is also provided a transmission mode configuration method for a network side apparatus. An exemplary process of the transmission mode configuration method for a network side apparatus is described in conjunction with FIG. 12.

Figure 12:
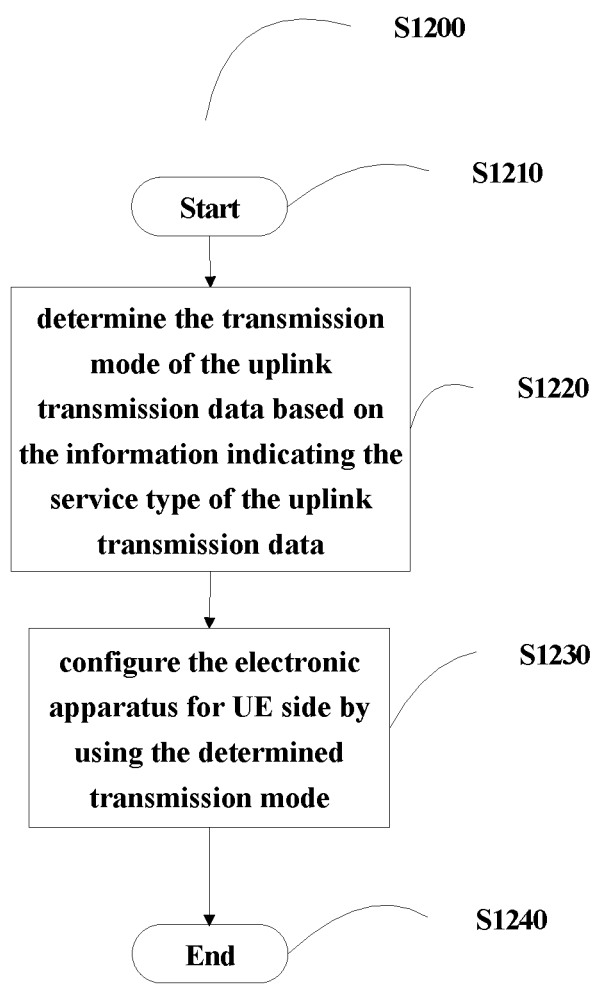
FIG. 12 is a flowchart schematically illustrating a transmission mode configuration method for a network side apparatus according to an embodiment of the present disclosure.

As shown in FIG. 12, the process flow 1200 of the transmission mode configuration method for a network side apparatus according to an embodiment of the present disclosure begins at S1210, and then the process of S1220 is performed.

In S1220, whether to adopt the transmission mode in which the uplink transmission data is transmitted to a central node apparatus so as to transmit the uplink transmission data to a network side apparatus is determined based on the information on the service type of the uplink transmission data to be transmitted to a network side apparatus by the electronic apparatus for UE side, received from the electronic apparatus for UE side. S1120 can also refer to the operation of the network configuration device described in conjunction with FIGS. 7 to 9, the detailed description thereof is omitted here. Then S1230 is performed.

In S1230, the electronic apparatus for UE side is configured by using the determined transmission mode, so that the electronic apparatus for UE side transmits the uplink transmission data according to the transmission mode configured by the network side apparatus. Then S1240 is performed.

The process flow 1200 ends at S1240.

As compared with the prior art, the electronic apparatus for UE side, the central node apparatus and the network side apparatus, the uplink data transmission method and the transmission mode configuration method according to embodiments of the present disclosure can implement at least one of the following: the signaling overhead of a large number of M2M terminals on a cellular network can be effectively reduced; the probability of congestion in the wireless network in which a large number of M2M terminals are introduced can be effectively reduced, so as to ensure the access to higher-priority services; the transmission power of the terminal with bad channel conditions can be effectively reduced, so as to achieve the purpose of power saving.

Example of Application

The electronic apparatus for UE side, the central node apparatus and the network side apparatus, the uplink data transmission method and the transmission mode configuration method according to embodiments of the present disclosure is particularly suitable for the transmission of the uplink transmission data by, for example, the low-cost M2M terminal device with special purpose, and the terminal apparatus deployed in the site with bad channel environment (such as smart meters in a basement).

Respective component units, subunits in the above mentioned electronic apparatus for UE side, the central node apparatus and the network side apparatus according to embodiments of the present disclosure can be configured by way of software, firmware, hardware, or any combination thereof. In the case of software or firmware implementation, programs constituting the software or firmware are installed to a machine with a dedicated hardware structure from a storage medium or a network, wherein the machine can execute various functions of the above component units, subunits when installed with various programs.

Figure 13:
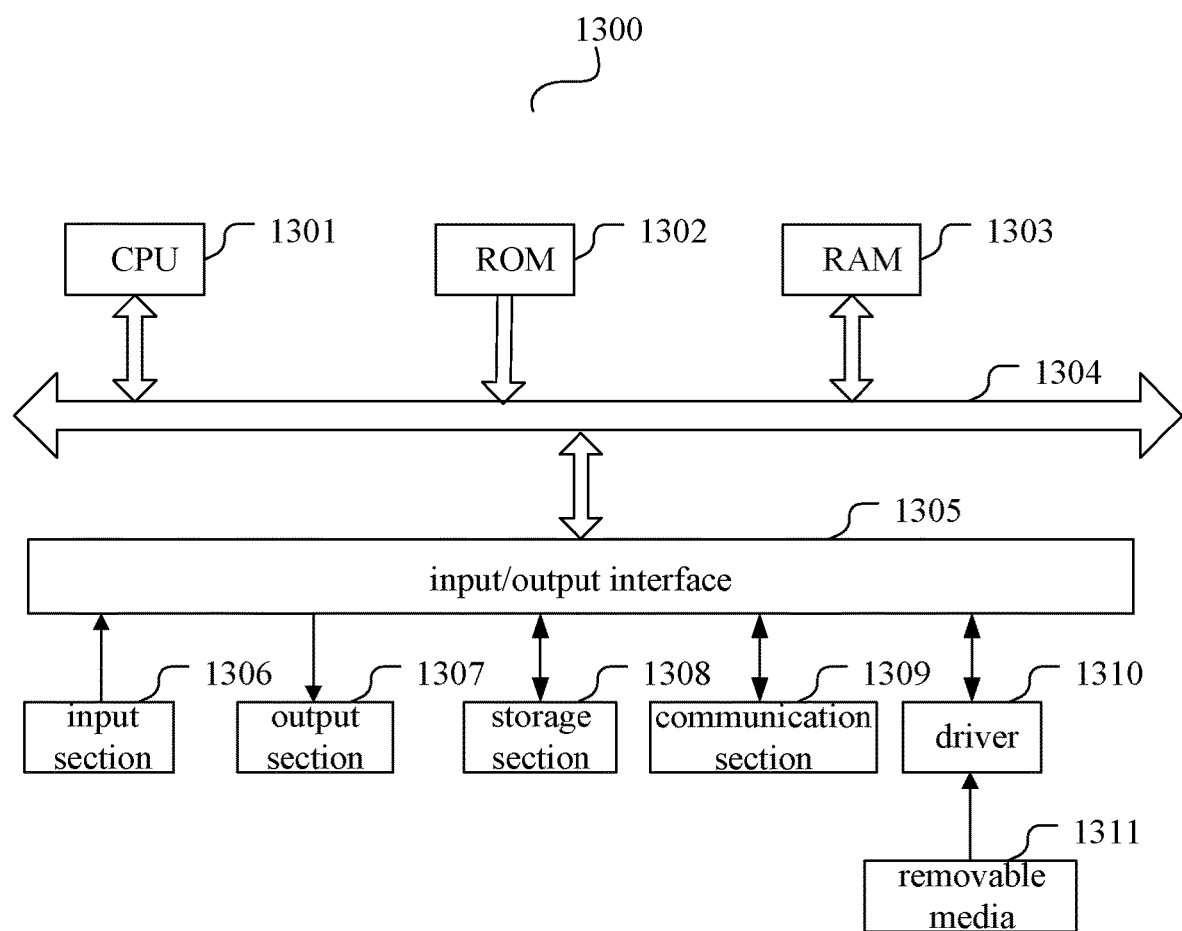
FIG. 13 is a structural diagram illustrating a possible hardware configuration for implementing the electronic apparatus, the central node apparatus and the network side apparatus according to embodiments of the present disclosure.

FIG. 13 shows a structure diagram of hardware configuration of a possible information processing apparatus used to implement the electronic apparatus for UE side, the central node apparatus and the network side apparatus, the uplink data transmission method and the transmission mode configuration method according to embodiments of the present disclosure.

In FIG. 13, a central processing unit (CPU) 1301 executes various processes according to programs stored in a read only memory (ROM) 1302 or programs loaded from a storage section 1308 to a random access memory (RAM) 1303. In the RAM 1303, the data required when the CPU 1301 executes various processes is stored as necessary. The CPU 1301, ROM 1302 and RAM 1303 are connected to each other via a BUS 1304. An input/output interface 1305 is also connected to the BUS 1304.

The following components are also connected to the input/output interface 1305: an input section 1306 (including a keyboard, mouse, etc.), an output section 1307 (including a display, such as a cathode ray tube (CRT), liquid crystal display (LCD), etc. and a speaker, etc.), a storage section 1308 (including hard disk, etc.), a communication section 1309 (including a network interface card such as a LAN card, modem, etc.). The communication section 1309 performs a communication process via a network such as the Internet. If necessary, a driver 1310 can be connected to the input/output interface 1305. A removable media 1311 such as a magnetic disk, an optical disk, a magneto-optical disk, a semiconductor memory or the like may be mounted on the driver 1310 as required, so that a computer program read out therefrom may be installed into the storage section 1308 as required.

In case of realizing the above described series of processing by software, a program constituting the software can be installed from a network such as the Internet or from a storage medium such as a removable medium 1311.

Those skilled in the art should understand that, the storage medium is not limited to the removable storage medium 1311 shown in FIG. 13 that stores programs therein and is distributed separately from the apparatus to provide a program to a user. Examples of the removable storage medium 1311 include a magnetic disk (including a floppy disk), an optical disc (including a compact disc read-only memory (CD-ROM) and a digital versatile disk (DVD)), a magneto-optical disk (including a mini disk (MD) (Registration trademarks) and a semiconductor memory. Alternatively, the storage medium may be the ROM 1302, a hard disk contained in the storage section 1308, etc., which have programs stored therein and are distributed to users along with the apparatus including them.

In addition, the present disclosure also provides a program product in which machine readable instruction codes are stored. The uplink data transmission method and the transmission mode configuration method according to embodiments of the present disclosure can be executed when the instruction code is read and executed by a machine. Accordingly, various storage medium such as a magnetic disk, optical disk, magneto-optical disk, a semiconductor memory for carrying such a program product is also included in the present disclosure.

In the above description of specific embodiments of the present disclosure, features that are described and/or illustrated with respect to one embodiment may be used in the same or similar way in one or more other embodiments and/or in combination with or instead of the features of the other embodiments.

Furthermore, the methods according to the present disclosure shall not be limited to being performed only in the chronological sequence described in the specification but can also be performed in another chronological sequence, concurrently or separately. Therefore, the technical scope of the present disclosure will not be limited by the sequence in which the methods are performed as described in the specification.

Additionally, it is obvious that each operational process of the aforementioned method according to the present disclosure can also be realized in the form of a computer-executable program stored in various machine-readable storage media.

In addition, the objects of the present invention can also be achieved by: directly or indirectly supplying the storage medium storing the aforementioned executable program code to a system or an apparatus, and reading and executing the program code by a computer or a central processing unit (CPU) in the system or apparatus.

In this case, as long as the system or the apparatus possesses the function to execute programs, embodiments of the present disclosure are not restricted to the program, and the program may also be in any form, such as a target program, an interpreter-executed program, or a script program supplied to an operating system, etc.

The aforementioned machine-readable storage medium includes, but not limited to, various memories and storage units, semiconductor apparatus, magnetic units such as optical, magnetic and magneto-optical disks, as well as other medium adapted to storing information.

Finally, as should be further explained, relational terms such as left and right, first and second, etc., when used in the present disclosure, are merely used to differentiate one entity or operation from another entity or operation, but not necessarily requiring or suggesting that these entities or operations have any such actual relation or sequence therebetween. Moreover, terms 'comprise', 'include' or any other variants thereof are meant to cover nonexclusive inclusion, so that processes, methods, objects or devices that include a series of elements not only include these elements, but also include other elements not explicitly listed, or further include elements inherent in the processes, methods, objects or devices. Without more restrictions, an element defined by the expression 'including a . . . ' does not preclude the further inclusion of other identical elements in the processes, methods, objects or devices that include this element.

Although the present disclosure has been disclosed above by the description of specific embodiments of the present disclosure, it should be understood that those skilled in the art can devise various modifications, improvements and equivalents of the present disclosure within the spirit and scope of appended claims. Such modifications, improvements and equivalents should also be regarded as being included in the protection scope of the present disclosure.

What is claimed is:

1. An electronic device at base station side in a wireless communication system, comprising circuitry, configured to decide a first user equipment to serve a second user equipment within proximity, via device-to-device communication, by forwarding data of the second user equipment to the base station under a condition that a link quality between the second user equipment and the base station is worse than a threshold, provide transmission resources for the first and second user equipment to transmit the data, wherein under a condition device-to-device communication is decided, discovery process is conducted between the first and second user equipment involving discovery signal, the discovery signal comprises an indication of characteristics of the data to be transmitted, and the indication of characteristics of the data indicates a transmission reliability requirement of the data.

2. The electronic device according to claim 1, wherein the characteristics comprise an indication of QCI of the data.

3. The electronic device according to claim 1, wherein the characteristics comprise a tolerance of delay of the data.

4. The electronic device according to claim 1, wherein the characteristics comprise a typical generation interval of the data.

5. The electronic device according to claim 1, wherein the characteristics comprise a typical size of the data.

6. The electronic device according to claim 1, wherein the link quality is determined based on a path loss of the link between the second user equipment and the base station.

7. The electronic device according to claim 1, wherein the discovery signal comprises an identification of the second user equipment.

8. The electronic device according to claim 1, wherein the electronic device is implemented as the base station.

9. A method for base station side in a wireless communication system, comprising deciding a first user equipment to serve a second user equipment within proximity, via device-to-device communication, by forwarding data of the second user equipment to the base station under a condition that a link quality between the second user equipment and the base station is worse than a threshold, providing transmission resources for the first and second user equipment to transmit the data, wherein under a condition device-to-device communication is decided, discovery process is conducted between the first and second user equipment involving discovery signal, the discovery signal comprises an indication of characteristics of the data to be transmitted, and the indication of characteristics of the data indicates a transmission reliability requirement of the data.

10. The method according to claim 9, wherein the characteristics comprise an indication of QCI of the data.

11. The method according to claim 9, wherein the characteristics comprise a tolerance of delay of the data.

12. The method according to claim 9, wherein the characteristics comprise a typical generation interval of the data.

13. The method according to claim 9, wherein the characteristics comprise a typical size of the data.

14. The method according to claim 9, wherein the link quality is determined based on a path loss of the link between the second user equipment and the base station.

15. The method according to claim 9, wherein the discovery signal comprises an identification of the second user equipment.

* * * * *